(12) United States Patent
Tobin

(10) Patent No.: US 9,104,869 B2
(45) Date of Patent: Aug. 11, 2015

(54) SYSTEMS AND METHODS FOR DEFEATING MALWARE WITH POLYMORPHIC SOFTWARE

(71) Applicant: eBay Inc., San Jose, CA (US)

(72) Inventor: John Patrick Edgar Tobin, San Jose, CA (US)

(73) Assignee: eBay Inc., San Jose, CA (US)

( * ) Notice: Subject to any disclaimer, the term of this patent is extended or adjusted under 35 U.S.C. 154(b) by 30 days.

(21) Appl. No.: 13/956,191

(22) Filed: Jul. 31, 2013

(65) Prior Publication Data

US 2015/0040223 A1    Feb. 5, 2015

(51) Int. Cl.
*G06F 21/00* (2013.01)
*G06F 21/56* (2013.01)

(52) U.S. Cl.
CPC ...................... *G06F 21/56* (2013.01)

(58) Field of Classification Search
CPC ................................ G06F 21/12; G06F 21/14
USPC ....................................................... 726/22, 23
See application file for complete search history.

(56) References Cited

U.S. PATENT DOCUMENTS

| 7,757,284 B1* | 7/2010 | Viljoen ........................... 726/22 |
| 2005/0216537 A1* | 9/2005 | Jiang et al. ..................... 707/205 |
| 2007/0028244 A1* | 2/2007 | Landis et al. .................. 718/108 |
| 2007/0039048 A1* | 2/2007 | Shelest et al. .................. 726/22 |
| 2007/0150881 A1* | 6/2007 | Khawand et al. ............. 717/162 |
| 2008/0126742 A1* | 5/2008 | Shupak et al. ................. 711/217 |
| 2010/0251378 A1* | 9/2010 | Eker et al. ....................... 726/26 |
| 2012/0233612 A1* | 9/2012 | Beckett ............................. 718/1 |

OTHER PUBLICATIONS

Pappas, "Smashing the Gadgets: Hindering Return-Oriented Programming Using In-Place Code Radomization", 2012, IEEE, p. 601-615.*
"Address space layout randomization—Wikipedia", [Online]. Retrieved from the Internet: <URL: http://en.wikipedia.org/wiki/Address_space_layout_randomization>, (May 23, 2013), 4 pgs.

(Continued)

*Primary Examiner* — Morshed Mehedi
*Assistant Examiner* — Gregory Lane
(74) *Attorney, Agent, or Firm* — Schwegman Lundberg & Woessner, P.A.

(57) ABSTRACT

Systems and methods for defeating malware with polymorphic software are described. The system generates randomized relocatable image information by randomizing a plurality of function information that is included in relocatable image information. The plurality of function information includes a first function information. The first function information includes a first location that is used to enter the first function information. The randomizing further includes updating instruction information in the randomized relocatable image information. Updating the instruction information further includes updating relative address information utilized to enter the first function via the first location based on a new location of the first function in the randomized relocatable image information. The system further applies a base address to the randomized relocatable image information to generate randomized executable image information, loads the randomized executable image information into the memory, and executes the randomized executable image information.

20 Claims, 16 Drawing Sheets

(56) References Cited

OTHER PUBLICATIONS

Presser, Leon, et al., "Linkers and Loaders", Computing Surveys, vol. 4, No. 3, (Sep. 1972), 149-167.

Shacham, Hovav, et al., "On the Effectiveness of Address-Space Randomization", CCS '04, (Oct. 25-29, 2004), 298-307.

* cited by examiner

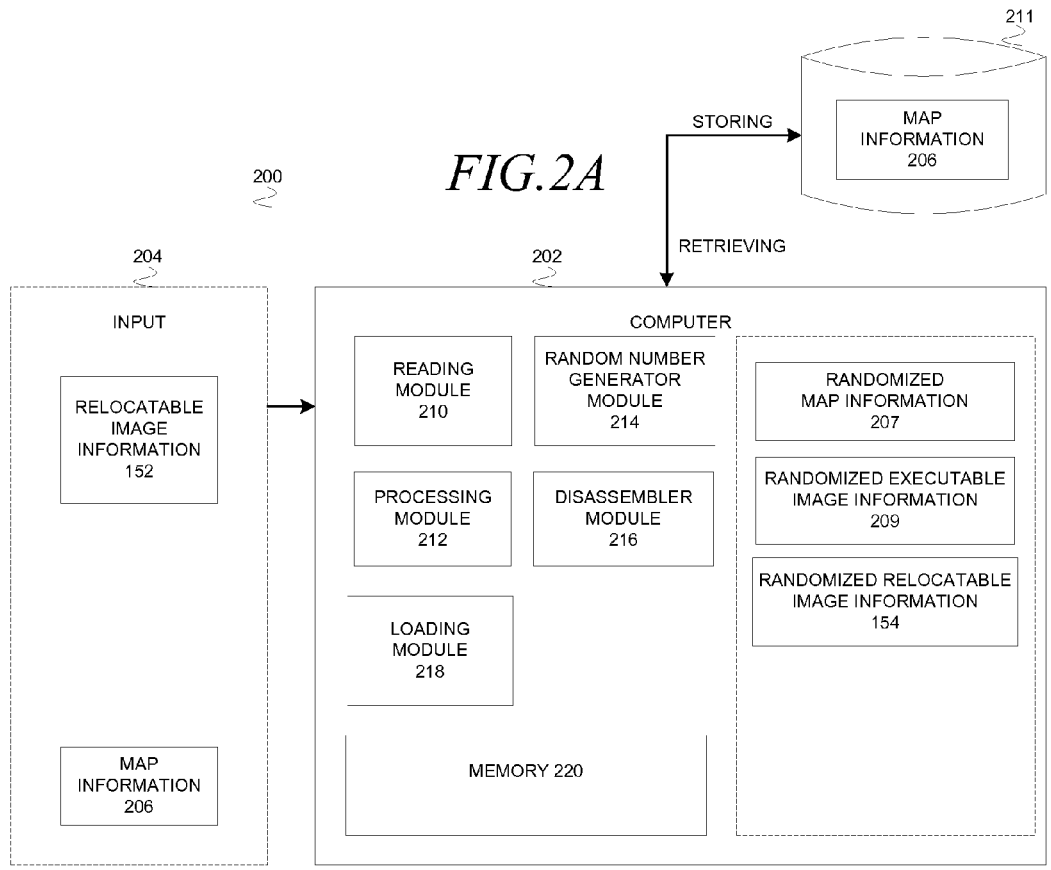
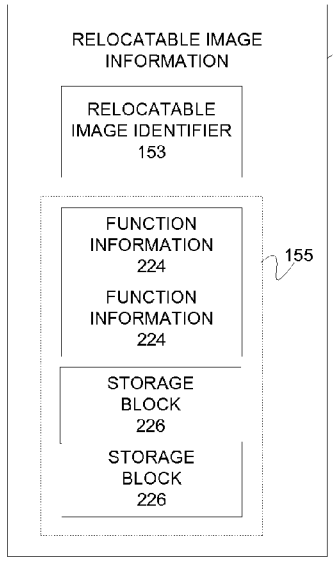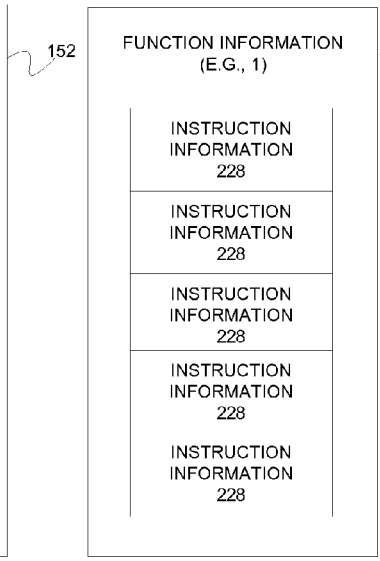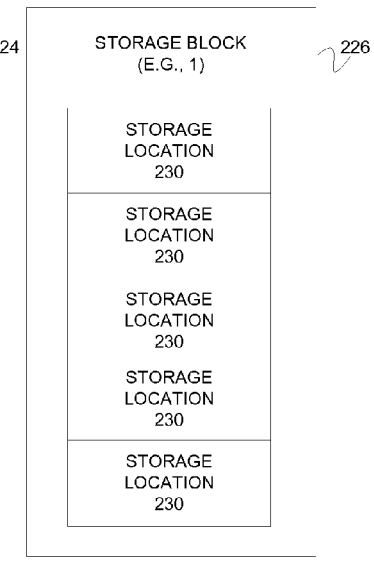

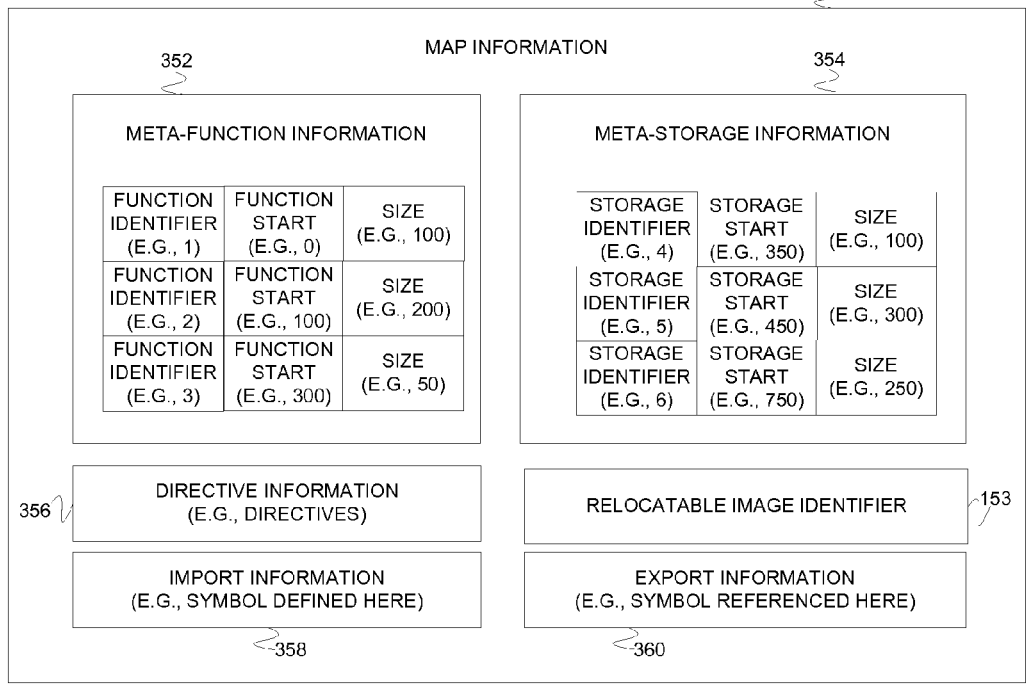

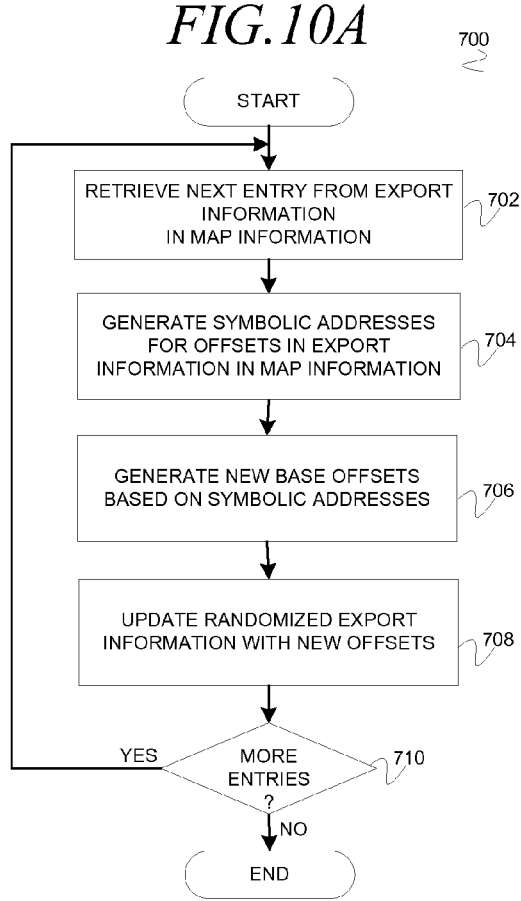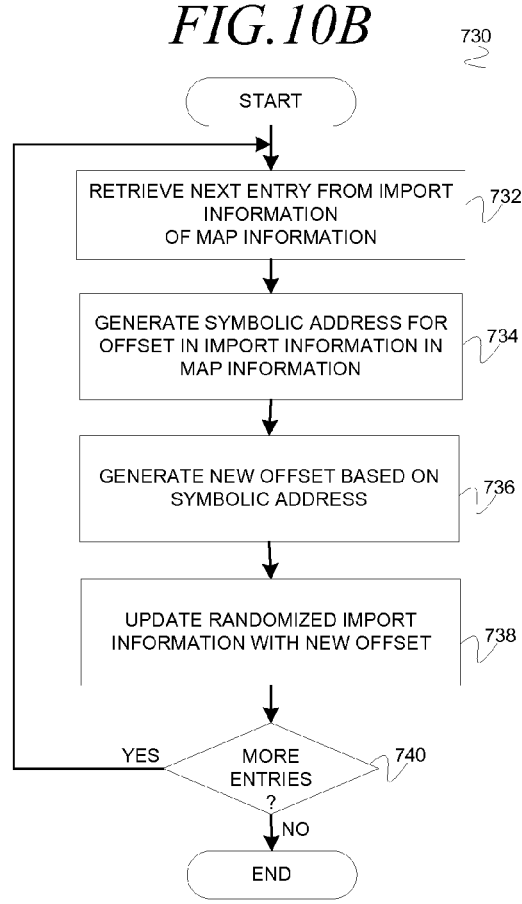

US 9,104,869 B2

SYSTEMS AND METHODS FOR DEFEATING MALWARE WITH POLYMORPHIC SOFTWARE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2013, All Rights Reserved.

TECHNICAL FIELD

This disclosure relates to the technical field of software development and, more particularly, systems and methods for defeating malware with polymorphic software.

BACKGROUND

The ubiquitous deployment of computer software has resulted in immeasurable benefits to those who use computers. Notwithstanding this incontrovertible gain, the quiet enjoyment of those users is continually threatened by the pestilence of malware.

BRIEF DESCRIPTION OF THE DRAWINGS

Embodiments illustrated, by way of example and not limitation, in the figures of the accompanying drawings, in which:

FIG. 2A is a block diagram a system, according to an embodiment, to defeat malware with polymorphic software;

FIG. 2B is a block diagram illustrating relocatable image information, according to an embodiment;

FIG. 2C is a block diagram illustrating function information, according to an embodiment;

FIG. 2D is a block diagram illustrating a storage block, according to an embodiment;

FIG. 5A is a block diagram illustrating map information, according to an embodiment;

FIG. 5B is a block diagram illustrating import information, according to an embodiment;

FIG. 5C is a block diagram illustrating export information, according to an embodiment;

FIG. 10A is a block diagram illustrating a method, according to an embodiment, to generate export information;

FIG. 10B is a block diagram illustrating a method, according to an embodiment, to generate import information;

DETAILED DESCRIPTION

Examples of systems and methods are directed to defeating malware with polymorphic software. In the following description, for purposes of explanation, numerous specific details are set forth in order to provide a thorough understanding of some example embodiments. It will be evident, however, to one of ordinary skill in the art that embodiments of the present disclosure may be practiced without these specific details. Further, it will be evident to one skilled in the art that well-known instruction instances, protocols, structures, and techniques have not been shown in detail.

Figure 1A:
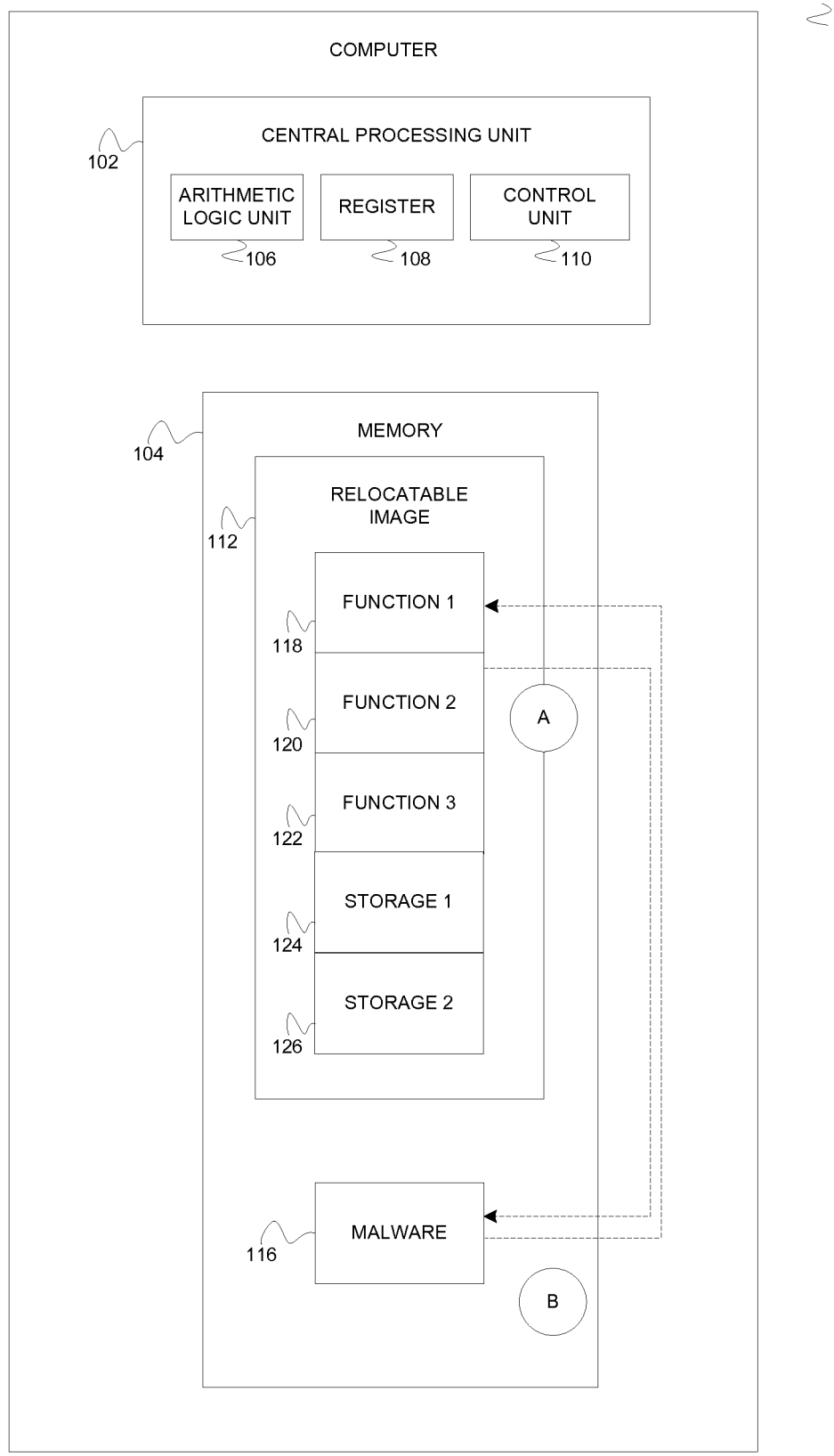
FIG. 1A illustrates a computer infected with malware, according to an embodiment.

FIG. 1A illustrates a computer 100 infected with malware, according to an embodiment. The computer 100 includes a central processing unit 102 (CPU) and memory 104. The central processing unit 102 may include an arithmetic logic unit 106 (ALU) for executing instructions, one or more registers 108 for temporary storage, and a control unit 110 (CU). The memory 104 may include a relocatable image 112 and malware 116. The relocatable image 112 may include multiple functions 118, 120, 122 (e.g., respectively numbered "1," "2," and "3") and multiple blocs of storage 124, 126 for storing data (e.g., respectively numbered "1," and "2"). Broadly, the CPU 102 may utilize the CU 110 to fetch instructions from the functions 118, 120, and 122 into the ALU 106 where they are executed. Execution is typically sequential (e.g., one instruction after the next) unless a jump or branch instruction is executed causing the execution of an instruction other than the one next stored in the memory 104.

At operation "A," the malware 116 is illustrated as wrestling control from the function 120 (e.g., function 2) by means of an exploit, vulnerability, or some other trickery. At operation "B," the malware 116 may invoke the function 118 (e.g., function 1) to perform a standard task. Function 118 is not malware 116. Rather, function 118 is part of the relocatable image 112 and may be utilized by the other functions (e.g., 120, 122) to provide a standard service such as printing or displaying. It is important to recognize the location of the function 118 in the relocatable image 112 as being fixed relative to the other functions 120 and 122. The malware 116 may branch or jump to the function 118 because the location of the function 118 in the relocatable image 112 relative to the other functions is known and does not change. Indeed, the author of the malware 116 may exploit this singular morphology of the relocatable image 112 by analysing the relocatable image 112 with an interactive disassembler such as Ida Pro, a popular interactive disassembler, to identify the entry location of function 1 in the relocatable image and utilize this information to program the malware 116 to intercept function 1. The author may further establish a substantial knowledge-base of such information for multiple images including the present relocatable image by exploiting the static morphology of software.

Figure 1B:
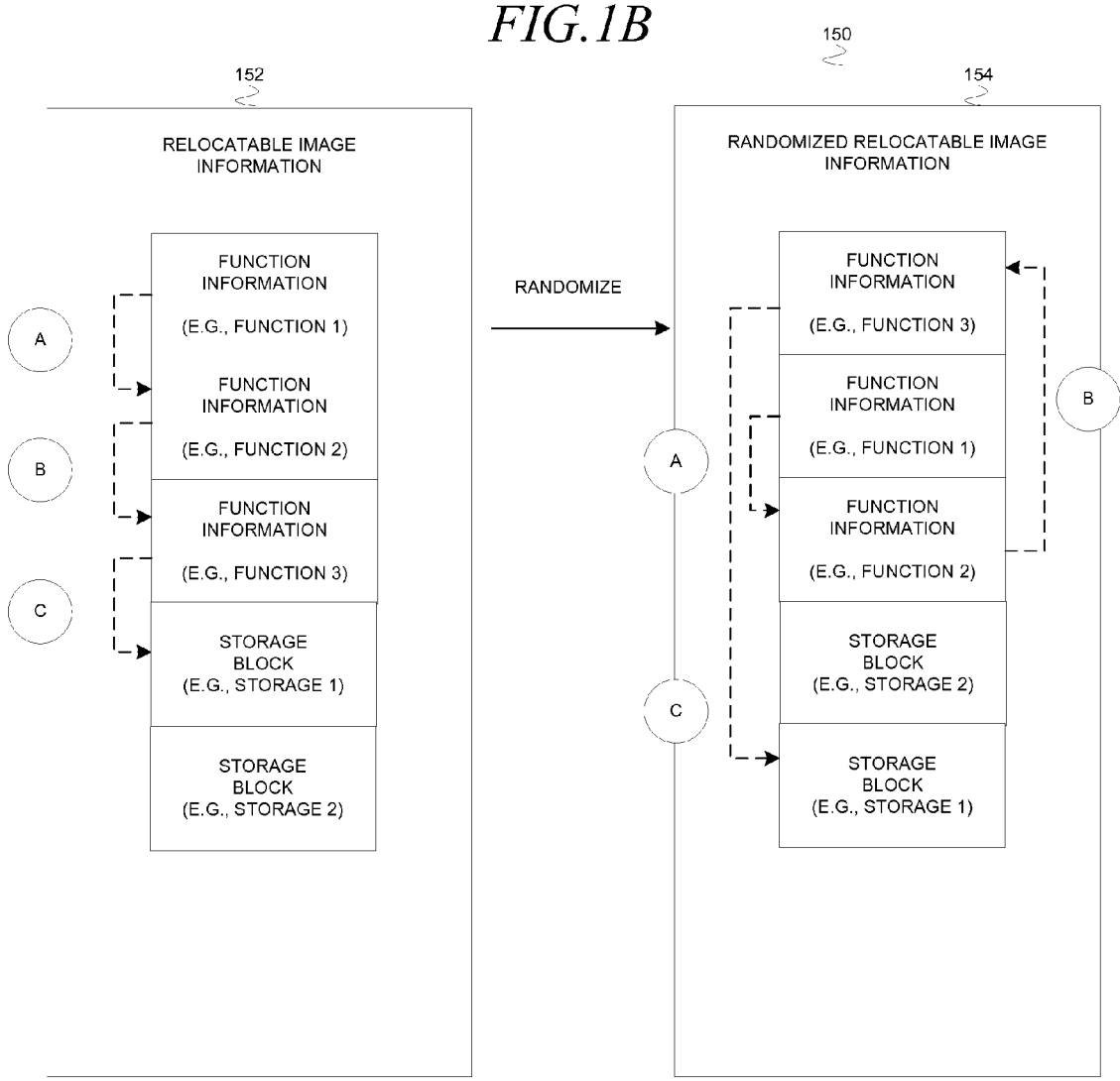
FIG. 1B illustrates a randomization concept, according to an embodiment.

FIG. 1B illustrates a randomization concept 150. The randomization concept 150 may include relocatable image information 152, as illustrated on the left, and randomized relocatable image information 154, as illustrated on the right. The relocatable image information 152 is shown to include a set of functions that are identified "function 1," "function 2," and "function 3" and a set of storage blocks identified "storage 1" and "storage 2." The relocatable image information 152 is shown to include, at operation "A," a jump to "function 2," at operation "B," a jump to "function 3," and at operation "C," an access to "storage block 1," as illustrated by the dashed lines that connect the aforementioned operations.

The relocatable image information 152 may be randomized to generate the randomized relocatable image information 154. For example, the same functions and storage blocks are now illustrated as ordered differently from top to bottom as "function 3," "function 1," "function 2," "storage block 2," and "storage block 1." The randomized relocatable image information 154 is shown to include the same operations, at operations "A," "B," and "C;" however, the dashed lines now illuminate the different locations and relative distances between the functions and storage blocks.

Randomization may be utilized to defeat malware because malware may no longer be programmed in advance to jump to locations in function information or storage blocks. A set of randomized functions and/or storage blocks constitutes polymorphic software that may be used to defeat malware.

FIG. 2A is a block diagram a system 200, according to an embodiment, to defeat malware with polymorphic software. The system 200 may include a computer 202 that receives input 204. The input 204 may include relocatable image information 152 and map information 206 that is optional. The computer 202 may generate randomized map information 207 and randomized relocatable image information 154 based on the input 204. In another embodiment, the map information 206 may be retrieved from persistent storage 211. In another embodiment, the map information 206 may generated by the computer 202. In another embodiment, the input 204 may be received over a network. In another embodiment, the relocatable image information 152 may be retrieved from the memory 220 or persistent storage 211.

The computer 202 may include a reading module 210 to read the input 204 into the computer 202, a processing module 212 to randomize the relocatable image information 152 to generate the randomized relocatable image information 154, a random number generator module 214 to generate a random number that may be used as a seed to randomize the order of the functions and storage (see FIG. 1B) in the relocatable image information 152, a disassembler module 216 that may optionally be used to disassemble the relocatable image information 152, and a loading module 218 to link and load the randomized relocatable image information 154 into memory 220 at a specific base address for execution as randomized executable image information 209.

FIG. 2B is a block diagram illustrating relocatable image information 152, according to an embodiment. The relocatable image information 152 may include a relocatable image identifier 153 that uniquely identifies the relocatable image information, and radomizable units 155 including function information 224 (e.g., each function is a unit) and storage blocks 226 (e.g., each storage block is a unit). The order of the radomizable units 155 may be randomized to generate the relocatable image information 152. The beginning of the relocatable image information 152 may be associated with a base address (not shown) of "0."

FIG. 2C is a block diagram illustrating function information 224, according to an embodiment. The function information 224 (e.g., function) may include instruction information 228 (e.g., instructions). A function is a sequence of program instructions that may perform a specific task. The function information 224 may be referred to as a "procedure," a "function," a "routine," a "method," or a "subprogram." The function may be invoked by other functions in the relocatable image information 152 and by other functions in another relocatable image information 152 that is linked to the relocatable image information 152 (e.g., dynamically linked library). The function information 224 may be started (called) several times and/or from several places during one execution of a program (e.g., relocatable image information that is executable), including from other function information 224, and then branch back (return) to the next instruction after the call, once the functions is done.

FIG. 2D is a block diagram illustrating a storage block 226, according to an embodiment. The storage block may include one or more storage locations 230 (e.g., bytes) that are accessible with an address to load and store data.

Figure 3A:
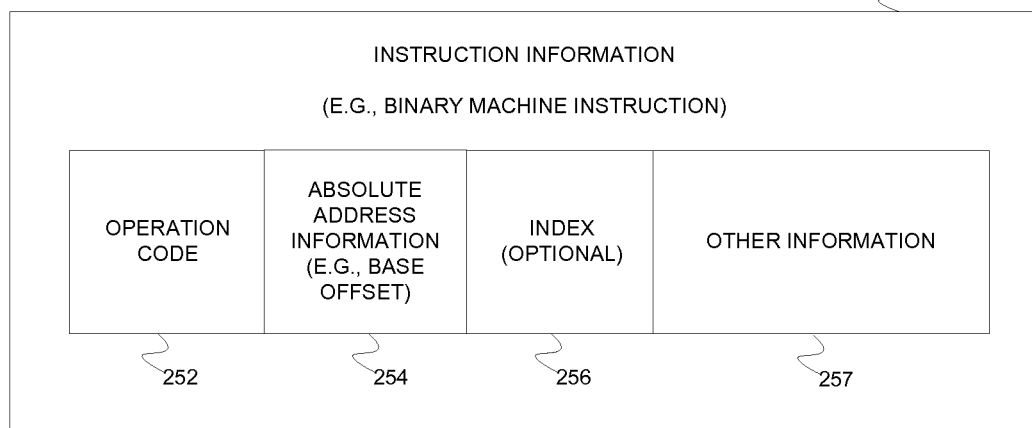
FIG. 3A is a block diagram illustrating instruction information, according to an embodiment, that utilizes absolute address information and a base offset.

FIG. 3A is a block diagram illustrating instruction information 228 that utilizes absolute addressing, according to an embodiment. The instruction information 228 (e.g., instruction) may include an operation code 252 that determines the operation that is performed by the instruction (e.g., jump, load, store, etc.), absolute address information 254, an index 256 that may be utilized in the addressing, and other information 257.

The absolute address information 254 may include a base offset or an absolute address. The base offset may be a positive numeric value that identifies a location in the present relocatable image information 152 (e.g., image) or zero which is a placeholder that signifies a location in another image to be resolved as export information at load time, as described in association with FIG. 5C and FIG. 10A of this document.

A positive numeric value may identify a location in the present image that includes instruction information 228 or a storage location 230. For example, a first function in relocatable image information 152 may include instruction information 228 that includes absolute address information 254 that includes a base offset of "266." Continuing with the example, the base offset of "266" may be added to a base address of "0" to identify instruction information 228 in a second function in the same relocatable image information 152. Prior to immediately loading the relocatable image information 152 into the memory 220 and in preparation of execution: 1) an address (e.g., 600000) may be selected as the base address for the relocatable image information 152; 2) the base address may be added to the base offset (e.g., 228) to generate an absolute address (e.g., 6000228); and 3) the absolute address may be written back into the absolute address information 254 of the instruction information 228.

Figure 3B:
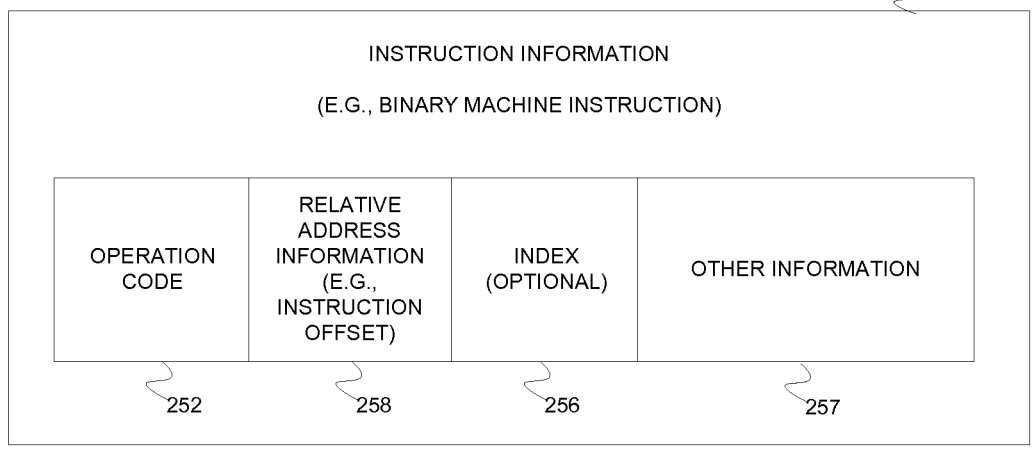
FIG. 3B is a block diagram illustrating instruction information, according to an embodiment, that utilizes relative address information and an instruction offset.

FIG. 3B is a block diagram illustrating instruction information 228 that utilizes relative addressing, according to an embodiment. The instruction information 228 may include relative address information 258. The other fields are as previously described. The relative address information 258 may include an instruction offset that is relative to the location of the instruction information 228. The instruction offset may identify a location in the relocatable image information 152. The relative address information 258 may be positive or negative and is limited in range by the size of the field that stores the instruction offset. The instruction offset may be added to the location of the instruction information 228 that includes the instruction offset to identify instruction information 228 in the same image or a storage location 230 in the same image. For example, a first function in relocatable image information 152 may include instruction information 228 (e.g., Instruction 1) that includes relative address information 258 that includes an instruction offset that may be added to the location of the instruction information 228 (e.g., Instruction 1) to identify the location of instruction information 228 (e.g., Instruction 2) in a second function in the same relocatable image information 152. In another embodiment, the instruction offset may be added to the location of the next instruction information 228 (e.g., Intel instruction formation) rather than the present instruction information 228.

The instruction information 228 that utilizes absolute addressing (as shown in FIG. 3A) and the instruction information 228 that utilizes relative addressing (as shown in FIG. 3B) may be included in an instruction set. An instruction set is part of an architecture for a particular type of computer 202. The instruction set may be related to programming, including the native data types, instructions, registers, addressing modes, memory architecture, interrupt and exception handling, and external input/output. The instruction set may further define a set of operation codes 252 and the commands implemented by a particular processor (e.g., AMD's AMD64, Intel's Intel 64).

Figure 4A:
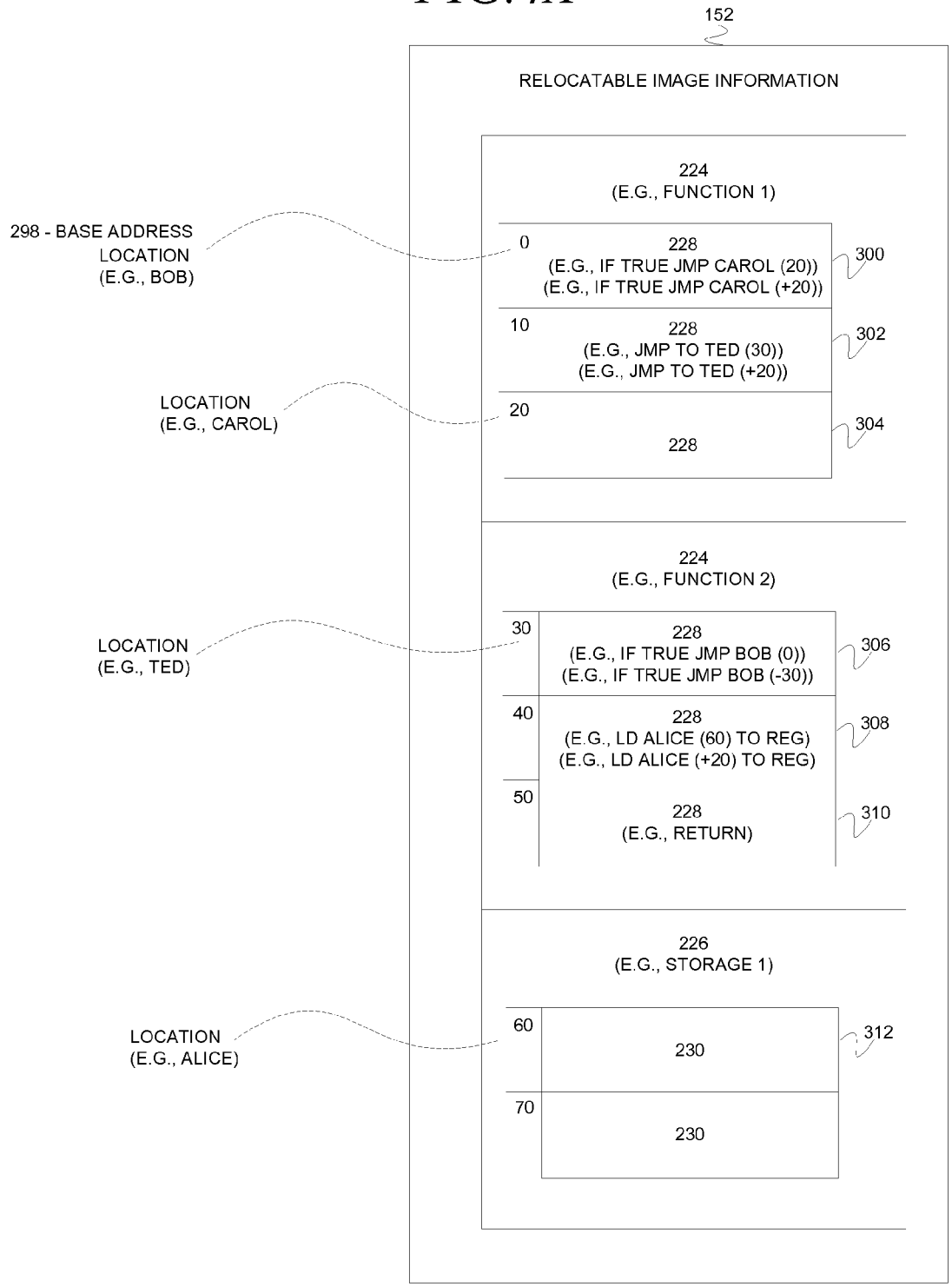
FIG. 4A is a block diagram illustrating relocatable image information, according to an embodiment.

FIG. 4A is a block diagram illustrating relocatable image information 152, according to an embodiment. The relocatable image information 152 is illustrated to include examples of function information 224 prior to randomization and loading. The relocatable image information 152 is illustrated to show function information 224 (e.g., function 1, function 2). Other embodiments may include additional function information 224 and additional storage blocks 226. The relocatable image information 152 is shown to include an address space from "0" to "70," as illustrated along the immediate left of the function information 224, moving from top to bottom. The address space of the relocatable image information 152 further includes a base address 298 of "0." Prior to loading, the base address 298, by convention, is "0."

"Function 1" may include instruction information 228 at the locations 300 and 302 and "Function 2" may include instruction information 228 at the locations 306, 308, and 310. The storage block 226 may include storage at location 312.

By way of example, the location 300 (e.g., BOB at base offset "0"), in "Function 1," may include instruction information 228 for a jump instruction that jumps to location 304 (e.g., CAROL at base offset "20") responsive to determination of TRUE. Otherwise, responsive to a determination of FALSE, execution continues at location 302. The jump instruction, at location 300, may use absolute address information 254 or relative address information 258, as previously determined by a programmer who author's source code that forces a specific operation code 252 in the instruction information 228 (not shown) or an assembler that selects a specific operation code 252 based on the source code. In this instance, the destination of the jump is "+20" for both types of addressing.

As a second example, at location 302, the instruction information 228 may include a jump instruction that jumps to the location 306 (e.g., TED at base offset "30") in "Function 2." For example, "TED," at base offset "30," may be the entry location for "Function 2." The instruction information 228, at location 302 (e.g., at base offset "10"), may include absolute address information 254 or relative address information 258. In this instance, the target/reference of the jump is "+30" for absolute addressing, as determined by the distance between the base address 298 at location 300 (e.g., BOB at base offset "0") and the location 306 (e.g., TED at base offset "30"). Further, the target/reference of the jump is +20 for relative addressing, as determined by the distance between the address of the instruction information at location 302 (e.g., at base offset "10") and the location 306 (e.g., TED at base offset "30").

As a third example, the location 306 (e.g., TED at base offset "30"), in "Function 2," may include instruction information 228 for a jump instruction that jumps to location 300 (e.g., BOB at base offset "0") responsive to determination of TRUE. Otherwise, responsive to a determination of FALSE, execution continues at location 308. The jump instruction, at location 306, may use absolute address information 254 or relative address information 258. In this instance, the destination of the jump is an absolute address of "0" for absolute addressing and a relative address of "−30" for relative addressing.

As a fourth example, at location 308, the instruction information 228 may include a load instruction to load a register from the location 312 (e.g., Alice at base offset "60"). The instruction information 228 may include absolute address information 254 or relative address information 258. In this instance, the absolute address information 254 is "+60" for absolute addressing, as determined by the distance between the base address 298 (e.g., at base offset "0") and the location 60 (e.g., Alice at base offset "60"). Further, the relative address information 258 is "+20" for relative addressing, as determined by the distance between the current location 308 (e.g., at base address "40") and the location 312 (e.g., Alice at base address "60").

Figure 4B:
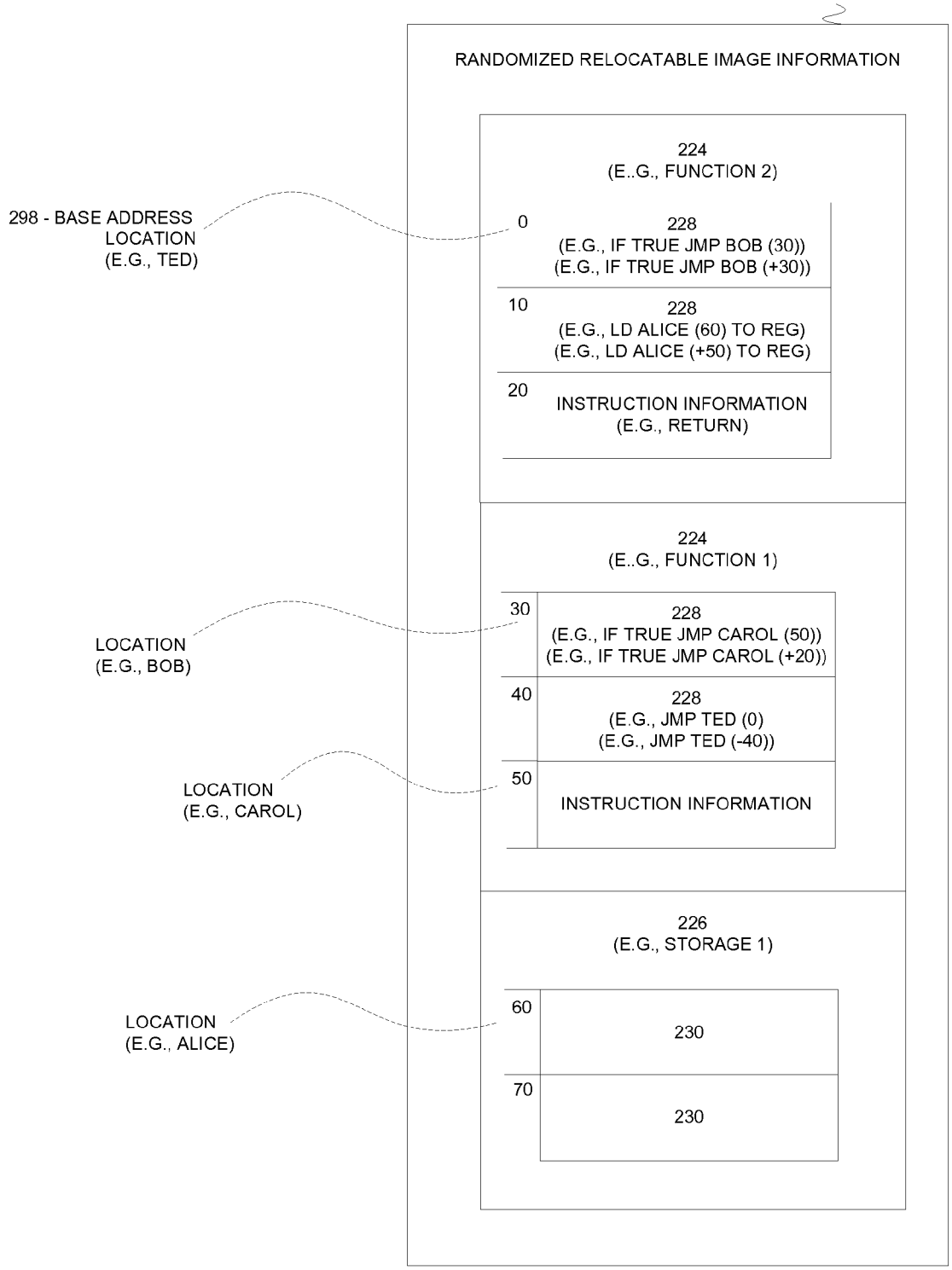
FIG. 4B is a block diagram illustrating randomized relocatable image information, according to an embodiment.

FIG. 4B is a block diagram illustrating randomized relocatable image information 154, according to an embodiment. The randomized relocatable image information 154 may include the same function information 224 and storage block 226, as illustrated in FIG. 4A, however, the order of the function information 224 is different. It will be appreciated that the order of storage blocks 226 may also be randomized, although the present example does not illustrate this feature. The order of the function information 224, from top to bottom, is now illustrated as "Function 2" as being followed by "Function 1." It will further be observed that absolute address information 254 and relative address information 258 in the respective function information 224 is now updated to accommodate the new order.

Figure 4C:
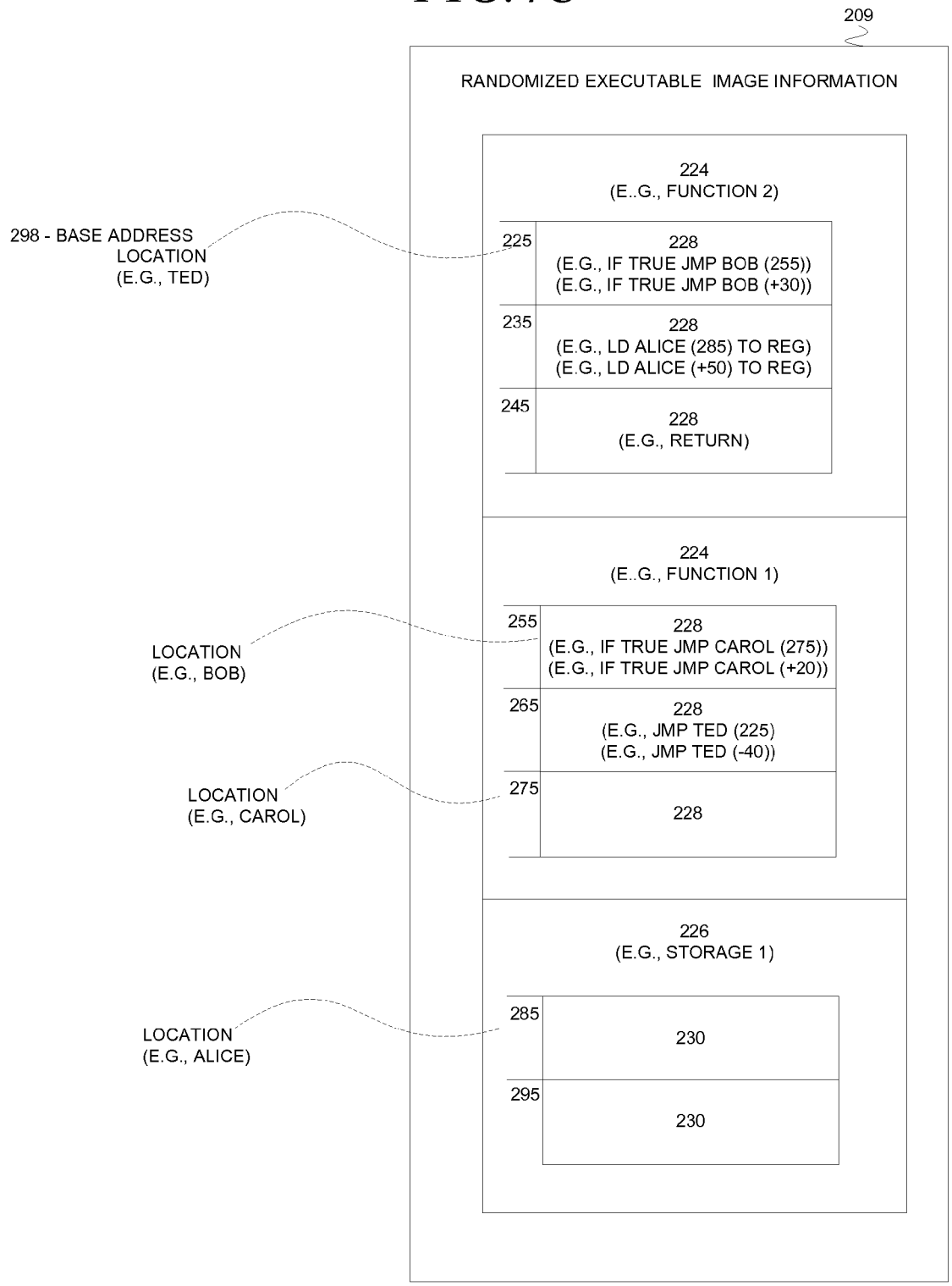
FIG. 4C is a block diagram further illustrating randomized executable image information, according to an embodiment.

FIG. 4C is a block diagram illustrating randomized executable image information 209, according to an embodiment. The randomized executable image information 209 is illustrated to include the same radomizable units 155 and the same order of the radomizable units 155, as illustrated in FIG. 4B; however, the base address is now registered with the memory address "225" in preparation of loading the randomized executable image information 209 into memory 220 at the same address. It will be observed that the examples of absolute address information 254 in the instruction information 228 are updated to incorporate the base address of "255" however the examples of relative address information 258 remain unchanged.

FIG. 5A is a block diagram illustrating map information 206, according to an embodiment. The map information 206 is associated with and describes a particular relocatable image information 152. According to one embodiment, the map information 206 may be an output of a software development process in association with the generation of the relocatable image information 152, as will be discussed in association with FIG. 6. According to another embodiment, the map information 206 may be an output that is generated by analysing the relocatable image information 152 with a disassembler module 216, as will be discussed in association with FIG. 7. According to yet another embodiment, the map information 206 may be retrieved from persistent storage 211.

The map information 206 may include meta-function information 352, meta-storage information 354, directive information 356, a relocatable image identifier 153 that uniquely identifies the associated relocatable image information 152, import information 358, and export information 360.

The meta-function information 352 may be organized according to rows where each row corresponds to a particular function (e.g., function information 224). Each function is associated with a function identifier, a function start address, and a size. The function identifier may be used to uniquely identify the function in the relocatable image information 152. The function start address is the start address of the function (e.g., base offset) relative to the beginning of the relocatable image information 152 (e.g., base address of "0"). The size provides a measure of the size of the function in a standard unit (e.g., byte count).

The meta-storage information 354 may be organized according to rows where each row corresponds to a particular storage block 226. Each storage block 226 is associated with a storage identifier, storage start address, and size. The storage identifier may be used to uniquely identify the storage block 226 in the relocatable image information 152. The storage start address may be the start address of the storage block 226 (e.g., base offset) relative to the beginning of the relocatable image information 152 (e.g., base address of "0"). The size is a measure of the size the storage block 226 in a standard unit of memory (e.g., byte count).

The directive information 356 may include directives that are used to configure the randomization of the relocatable image information 152. For example, the directive information 356 may include a directive to limit function information 224 associated with a set of function identifiers to be located at a lower address in memory than the remaining function information 224 in the relocatable image information 152. Also, for example, the directive information 356 may include a directive to not randomize an identifiable part of the relocatable image information 152. In one embodiment, the directive may identify the part with base offsets. For example, a lower base offset and an upper base offset may delimit the part in the relocatable image information 152. In another embodiment, the directive may identify a part with a function identifier or a storage identifier. In another embodiment, a directive may include a Boolean test. For example, the Boolean test may identify a part as described above provided that a condition is satisfied.

The import information 358 is described in association with FIG. 5B and the export information 360 is described in in association with FIG. 5C.

FIG. 5B is a block diagram illustrating import information 358, according to an embodiment. The import information 358 is organized according to rows where each row may correspond to a symbol that is defined in the relocatable image information 152 and referenced by instruction information 228 that is included in another image (e.g., relocatable image information 152 or randomized relocatable image information 154). Accordingly, the concept of "import" is with reference to control, because control is imported to the relocatable image information 152 via the symbol in the import information 358. For example, an entry in the import information 358 may correspond to a symbol that identifies the location of instruction information 228 in the present relocatable image information 152 that receives control from instruction information 228 in another image (e.g., relocatable image information 152 or randomized relocatable image information 154). One example of another image may include a dynamically linked library that is linked to the relocatable image information 152 by the loading module 218 at loading time. Additional images may also be linked at load time. Each row may include a symbol that is associated with a base offset that identifies a location in the present relocatable image information 152. The base offset may be a distance (e.g., bytes) from the location of the beginning of the relocatable image information 152 to the location of the symbol.

At load time, the import information 358 may be used by the loading module 218 to resolve the absolute address information 254 in another image with locations in the present relocatable image information that are identified with the symbols. For example, the base offset for a particular location (e.g., "+30," associated with symbol "TED") may be added to the base address of the present relocatable image information 152 (e.g., 555) and written into the absolute address information 254 (e.g., 585) of instruction information 228 (e.g., "Jump to TED") in another relocatable image information 152.

FIG. 5C is a block diagram illustrating export information 360, according to an embodiment. The export information 360 is organized according to rows where each row may correspond to a symbol that is defined in another image (e.g., relocatable image information 152 or randomized relocatable image information 154) and referenced by instruction information 228 that is included the present relocatable image information 152. Accordingly, the concept of "export" is with reference to control because control is exported from the randomized relocatable image information 154 to another image via a symbol that is referenced with instruction information 228 in the present relocatable image information 152 and defined in another image. For example, an entry in the export information 360 may correspond to a symbol that identifies a location of instruction information 228 in another image (e.g., relocatable image information 152 or randomized relocatable image information 154) that receives control from instruction information 228 in the present relocatable image information 152.

The export information 360 may include one or more rows that respectively include a symbol associated with one or more base offsets. The base offsets may be relative to the beginning of the present image and identify instruction information 228 in the present image that includes absolute address information 254 that requires resolution at load time. For example, the instruction "Jump to "HARRY" may be included in the present relocatable image information 152 and the symbol "HARRY" may be defined in another image. At load time, the base offset in the export information 360 is utilized to identify the location of absolute address information 254 in present relocatable image information that requires an updating of the absolute address of the location "HARRY" in the other image.

Figure 5D:
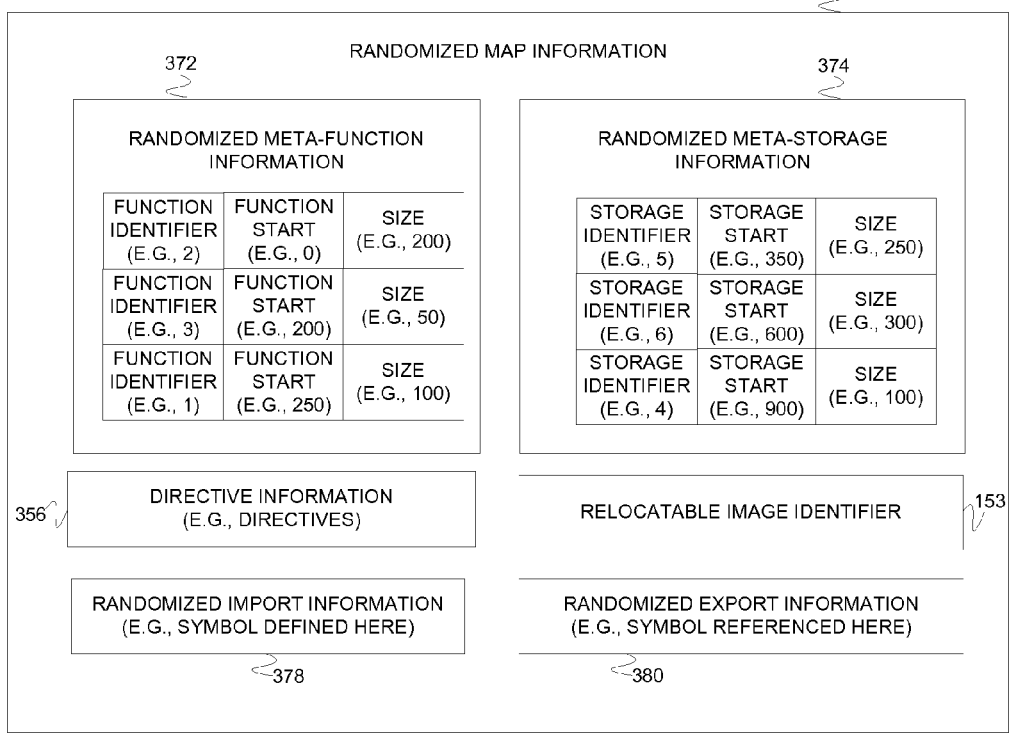
FIG. 5D is a block diagram illustrating randomized map information, according to an embodiment.

FIG. 5D is a block diagram illustrating randomized map information 207, according to an embodiment. The randomized map information 207 may be generated by the processing module 212 based on the randomized relocatable image information 154 and the map information 206, as discussed more fully in association with FIG. 8 and FIG. 9. The randomized map information 207 may include randomized meta-function information 372, randomized meta-storage information 374, directive information 356, a relocatable image identifier 153, randomized import information 378, and randomized export information 380. The randomized map information 207 may include new function start values based on the new position of the function information 224 and new storage start values based on the new position of the storage blocks 226. Further, the randomized import information 378 that may include new base offsets and the randomized export information 380 may include new base offsets. Finally, the directive information 356 is a duplicate copy of the directive information 356 in the map information 206.

Figure 5E:
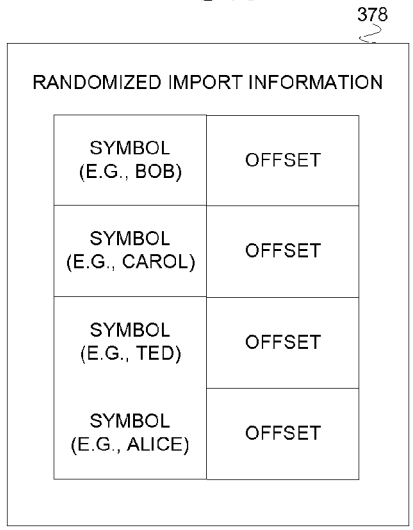
FIG. 5E is a block diagram illustrating randomized import information, according to an embodiment.

FIG. 5E is a block diagram illustrating randomized import information 378, according to an embodiment. The randomized import information 378 may include the same organization and elements (e.g., symbol, offset) as previously described with respect to the import information 358, however, the offsets are now updated to indicate the new location of the symbols after randomization.

Figure 5F:
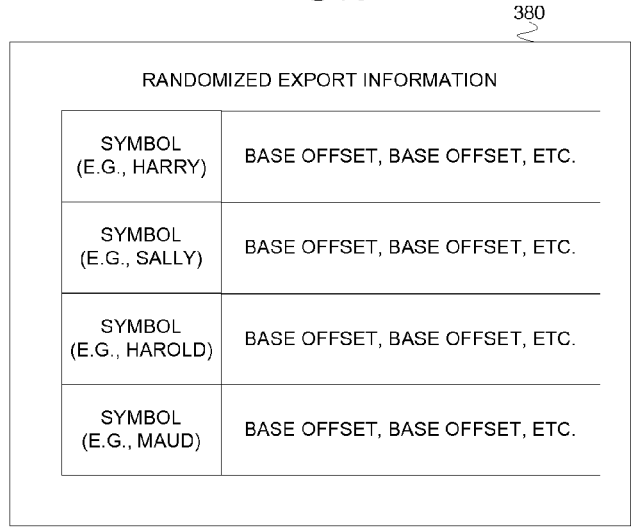
FIG. 5F is a block diagram illustrating randomized export information, according to an embodiment.

FIG. 5F is a block diagram illustrating randomized export information 380, according to an embodiment. The randomized export information 380 may include the same organization and elements (e.g., symbol, offset) as described with respect to the export information 360, however, the offsets are now updated to indicate the new location of the instruction information 228 after randomization.

Figure 6:
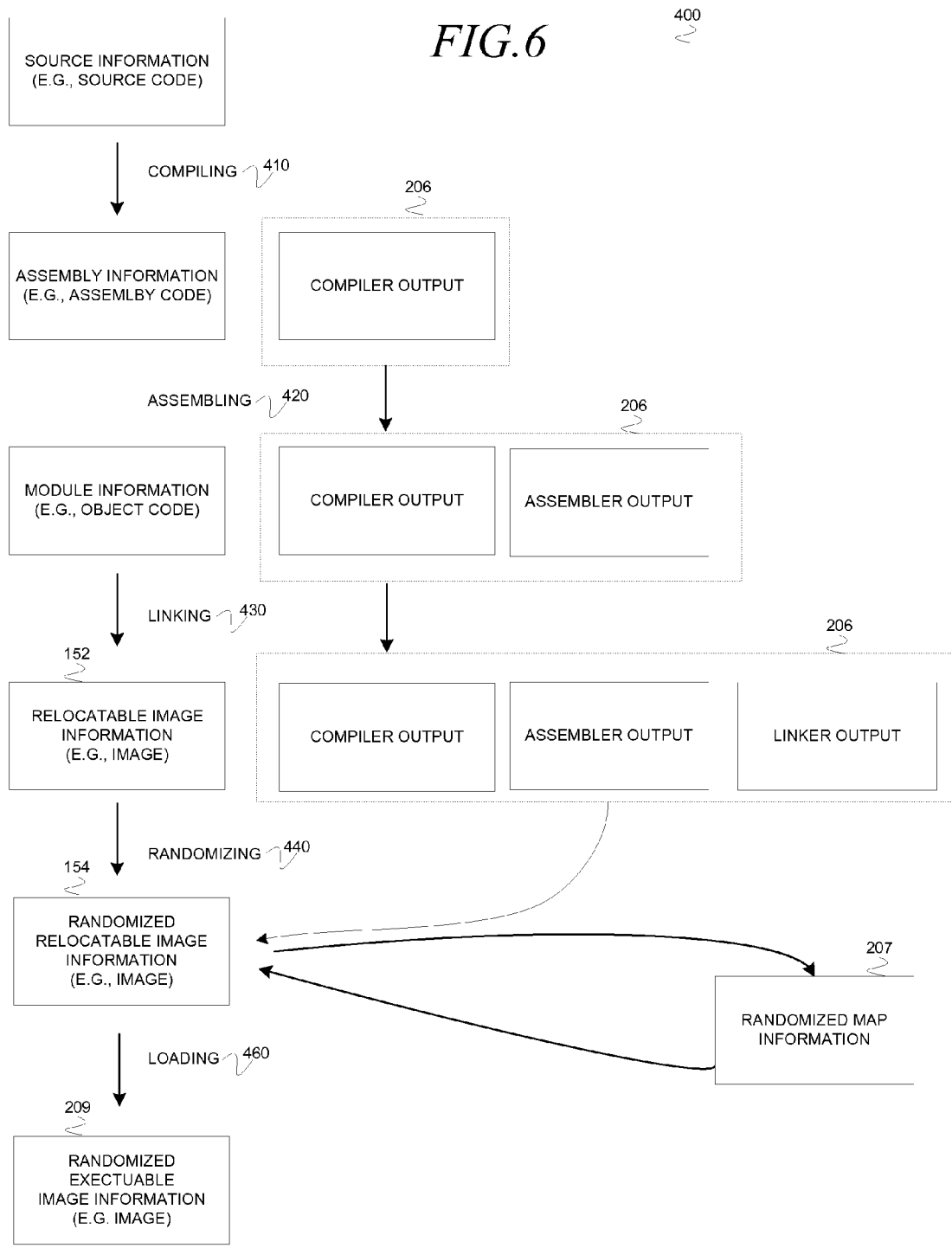
FIG. 6 is a block diagram illustrating a software development process, according to an embodiment.

FIG. 6 is a block diagram illustrating a software development process 400, according to an embodiment. The software development process 400 may include a compiling process 410, an assembling process 420, a linking process 430, a randomizing process 440, and a loading process 460. The compiling process 410 may receive source information (e.g., source code) and compile the source code to generate assembly information (e.g., assembly code) and compiler output (e.g., map information 206). The assembling process 420 may receive the assembly information (e.g., assembly code) and the compiler output and assemble the assembly code to generate module information (e.g., object code) and assembler output (e.g., map information 206). The linking process 430 may receive one or more module information (e.g., object code) with associated compiler output and assembler output (e.g., map information 206) to generate relocatable image information 152 (e.g., object code) and linker output.

The randomizing process 440 may receive the relocatable image information 152 and the map information 206 and generate the randomized relocatable image information 154 and randomized map information 207. The randomizing process 440 may randomize the order to the function information 224 and the storage blocks 226, as previously described. The randomizing process 440 may receive the map information 206 that is generated from the compiling process 410, the assembling process 420, and the linking process 430. Other development processes may be associated with the above described steps and facilitate the generation of the map information 206. For example, the generation of the map information 206 may be facilitated by intermediate language. Further, the map information 206 may be embodied in many different forms that originate in many different types of development technology (e.g., Java.net, .NET, Java, etc.). In another embodiment, the map information 206 may be generated with the disassembler module 216. For example, the disassembler module 216 may be utilized to analyse the relocatable image information 152 to generate the meta-function information 352, the meta-storage information 354, the import information 358, and the export information 360, as described in operation 510 of FIG. 7. In another embodiment, the map information 206 may be retrieved from persistent storage 211, as described in operation 508 of FIG. 7.

The loading process 460 may receive the randomized relocatable image information 154 and the randomized map information 207 to generate and load the randomized executable image information 209 into the memory 220 of the computer 202. The randomized executable image information 209 may now be executed by the computer 202.

Figure 7:
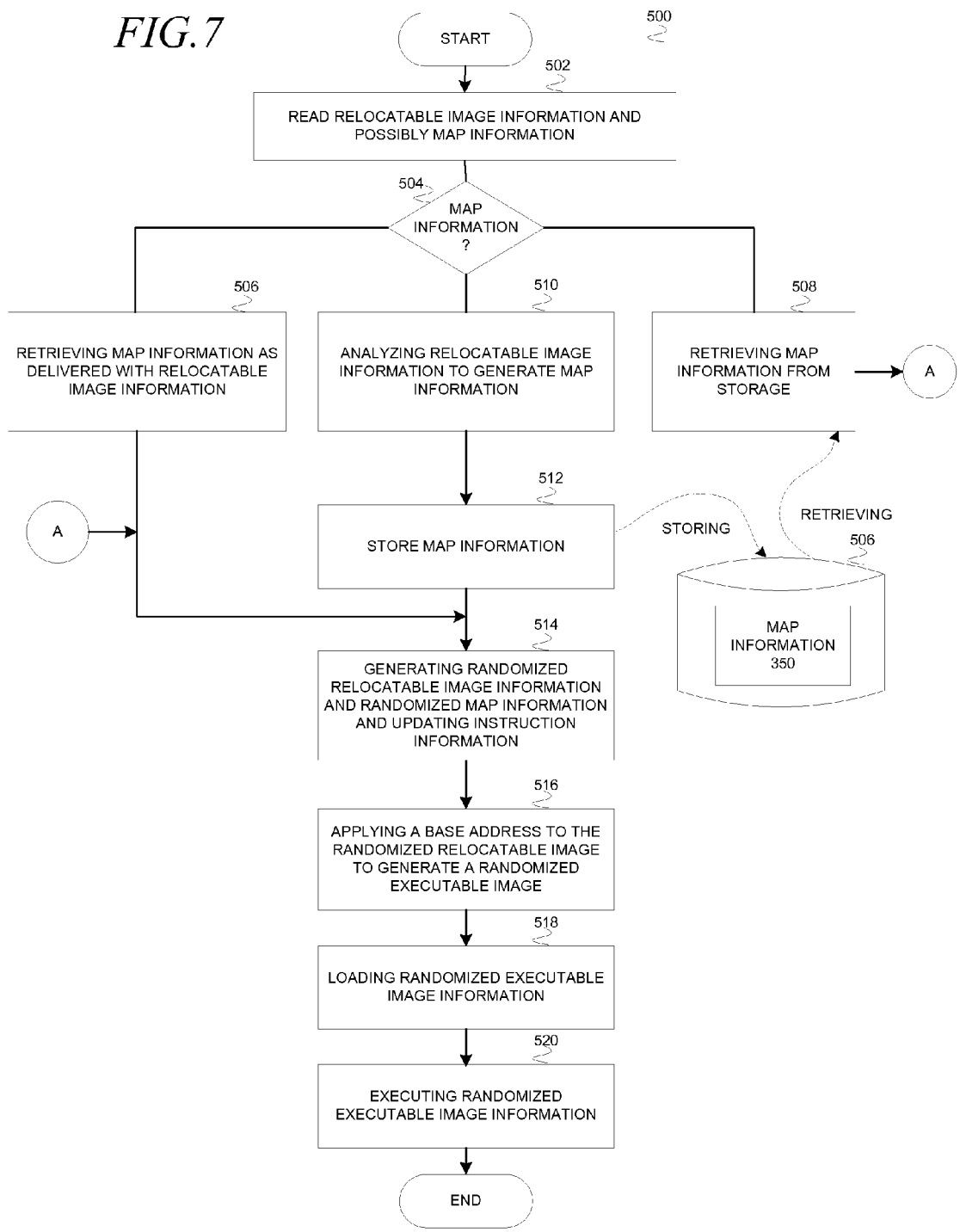
FIG. 7 is a block diagram illustrating a method, according to an embodiment, to defeat malware with polymorphic software.

FIG. 7 is a block diagram illustrating a method 500, according to an embodiment, to defeat malware with polymorphic software. The method 500 may commence at operation 502, at the computer 202 (e.g., mobile phone, wearable device, personal computer (PC), set-top box, tablet, etc.), with the reading module 210 reading/receiving the relocatable image information 152. In one embodiment, the reading module 210 may further read/receive map information 206 that is associated with the relocatable image information 152. In one embodiment, the relocatable image information 152 and the map information 206 may be received over a network.

At decision operation 504, the processing module 212 may identify a source of map information 206 for generating the randomized relocatable image information 154. If the processing module 212 identifies the map information 206 as being received by the reading module 210, then processing continues at operation 506. Otherwise, the processing module 212 may identify whether map information 206 associated with the relocatable image information 152 is stored in persistent storage 211. For example, the processing module 212 may identify whether the relocatable image identifier 153 that is included in the relocatable image information 152 matches the relocatable image identifier 153 that is included in any of the map information 206 that is stored in persistent storage 211. If the processing module 212 identifies matching map information, then processing continues at operation 508. Otherwise the processing module 212 continues processing at operation 510. Other embodiments may apply the above described decisions in a different order.

At operation 506, the processing module 212 may retrieve the map information 206 that was received/retrieved with the relocatable image information 152. At operation 508, the processing module 212 may retrieve the map information 206 that matches the relocatable image information 152 from persistent storage 211 and processing continues at operation 514, as illustrated by the connector "A." At operation 510, the processing module 212 may invoke the disassembler module 216 to analyze the relocatable image information 152 to generate the map information 206. For example, the disassembler module 216 may be embodied as a modified form of the Interactive Disassembler (IDA), a shareware application created by Ilfak Guilfanov that was later sold as a commercial product by DataRescue, a company located in Liege, Belgium. Other embodiments may use other disassembler modules 216 that disassemble the relocatable image information to generate the meta-function information 352, the meta-storage information 354, the import information 358, and the export information 360 in the map information 206.

At operation 512, the processing module 212 may store the map information 206 in persistent storage 506 At operation 514, the processing module 212 may generate the randomized map information 207, generate the randomized relocatable image information 154, and update the instruction information as further described in FIG. 8, FIG. 9, FIG. 10, and FIG. 11.

Application of Base Address

At operation 516, the loading module 218 may identify and apply a new base address to the randomized relocatable image information 154 to generate the randomized executable image information 209. For example, the loading module 218 may identify a location of a block of the memory 220 of sufficient size to accommodate the randomized relocatable image information 154. Responsive to the identification, the loading module 218 may update the old base address "0" with a new base address for each of the instruction information 228 in the randomized relocatable image information 154 that utilize absolute address information 254. For example, the loading module 218 may identify and apply a base address of "1000" to a first base offset of "100" in absolute address information 254 in instruction information 228 to generate an absolute address of "1100." Further, the loading module 218 may write the absolute address of "1100" back into the absolute address information 254, thereby overwriting the base offset.

Linking as Part of Loading

The loading module 218 may further identify other images (e.g., randomized relocatable image information 154 and/or other relocatable image information 152) (e.g., dynamically linked library) and link the other images to the present randomized relocatable image information 154. The loading module 218 may link the other images based on the randomized export information 380 and the randomized import information 378 in the randomized map information 207, and the export information 360 and import information 358 of the other images.

At operation 518, the loading module 218 may load the randomized executable image information 209 into the memory 220 of the computer 202, and at operation 520, the computer 202 may execute the randomized relocatable image information 154.

Figure 8:
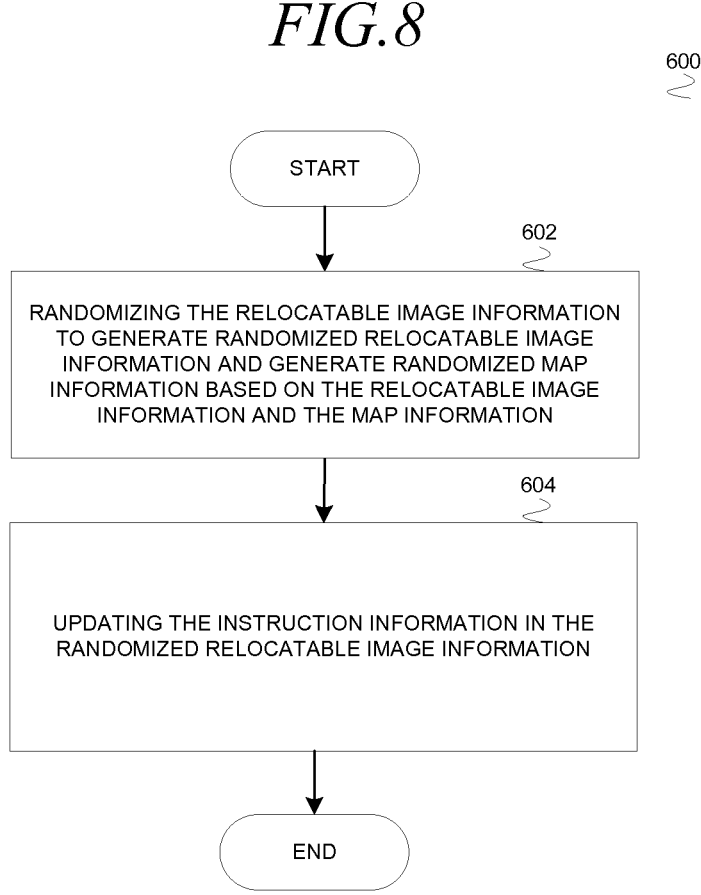
FIG. 8 is a block diagram illustrating a method, according to an embodiment, to generate randomized relocatable image information, generate randomized map information, and update instruction information.

FIG. 8 is a block diagram illustrating a method 600, according to an embodiment, to generate randomized relocatable image information 154 and randomized map information 207. The method 600 may commence at operation 602 with the processing module 212 randomizing the relocatable image information 152 to generate randomized relocatable image information 154 and the processing module 212 generating randomized map information 207, as further discussed in association with FIG. 9. At operation 604, the processing module 212 may update the instruction information 228 in the randomized relocatable image information with new base offsets and new instruction offsets, as further discussed in association with FIG. 11.

Figure 9:
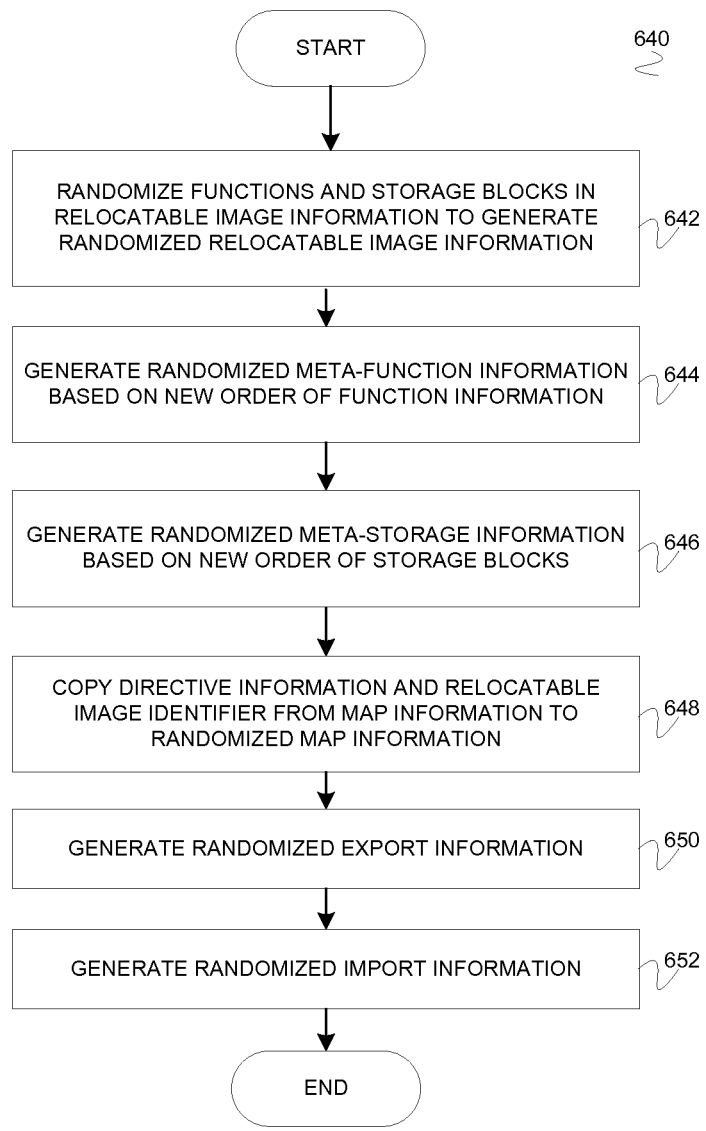
FIG. 9 is a block diagram illustrating a method, according to an embodiment, to randomize relocatable image information and generate randomized map information.

FIG. 9 is a block diagram illustrating a method 640, according to an embodiment, to randomize relocatable image information 152 and generate randomized map information 207. The method 640 may commence at operation 642 with the processing module 212 randomizing the function information 224 and the storage blocks 226 to generate randomized relocatable image information 154. For example, the processing module 212 may invoke the random number generator module 214, which may generate a random number that is used as a seed to generate a sequence of numbers (e.g., 2, 1, 3) where each number corresponds to a function identifier in the meta-function information 352 or a storage identifier in the meta-storage information 354 of the map information 206. Accordingly, the old order may be represented with a sequence of function identifiers of "1," "2," and "3," and the new order may be represented with function identifiers of "2," "3," and "1." The processing module 212 may generate the randomized relocatable image information 154 by copying reordered function information 224 and the storage blocks 226 to memory 220 from the relocatable image information 152 in accordance with the sequence of numbers. It will be appreciated by one having skill in the art that the random generation of a seed that is used to determine the order of functions and storage blocks for each loading of the present image may be used to frustrate malware 116 that relies on static and unchanging locations of the functions and storage blocks. It will further be appreciated that randomization is not limited to the loading of the present image but may be applied to the loading of each and every image.

At operation 644, the processing module 212 may generate the randomized meta-function information 372 based on the new order of the function information 224. For example, the processing module 212 may generate the function start (e.g., base offset from beginning of relocatable image information 152) based on the new order of the functions. Merely for example, (please compare the function identifiers of FIG. 5A with FIG. 5D) "function 2" now begins at location "0" (e.g., first row in randomized meta-function information 372) and ends at location "199" based on a size of "200." The size may be obtained from the corresponding row in the meta-function information 352 of the map information 256. Accordingly, the first row in the randomized map information 207 may include a function identifier of "2," a function start of "0," and a size of "200." Also for example, function "1" may begin at location "200" (e.g., second row in randomized meta-function information 372) and end at location "299" based on a size of "100." Again, the size may be obtained from the appropriate row in the meta-function information 352 of the map information 206 based on a function identifier of "2." Accordingly, the second row in the randomized map information 207 may be generated to include a function identifier of "1," a function start of "200," and a size of "100." The processing module 212 may generate the meta-function information 372 by iterating the above steps.

At operation 646, the processing module 212 may generate the randomized meta-storage information 374 based on the randomized map information 207 and the new order of the storage blocks 226. For example, the processing module 212 may generate the randomized meta-storage information 374 in substantially the same manner as described with respect to the randomized meta-function information 372.

At operation 648, the processing module 212 may copy the directive information 356 and the relocatable image identifier 153 to the randomized map information 207.

At operation 650, the processing module 212 may generate the randomized export information 380 in the randomized map information 207, as discussed in association with FIG. 10A. At operation 652, the processing module 212 may generate the randomized import information 378 in the randomized map information 207, as discussed in association with FIG. 10B.

FIG. 10A is a block diagram illustrating a method 700, according to an embodiment, to generate randomized export information 380. Recall that the loading module 218 may use the randomized export information 380 to link the randomized relocatable image information 154 with another image (e.g., relocatable image information 152 or randomized relocatable image information 154). The method 700 may commence at operation 702 with the processing module 212 retrieving the next entry (e.g., row) of export information 360 from the map information 206. Recall that each entry (e.g., row) in the export information 360 may include a set of base offsets that identify the location of instruction information 228 in the relocatable image information 152 that targets/references "HARRY" (e.g., "Store Reg 1 to HARRY" or "Jump to HARRY") and that "HARRY" is a location that is defined in another image. For example, the first row in the export information 360 is for the symbol "HARRY" and is associated with the base offsets of "+20" and "+310" (as shown in FIG. 5C).

At operation 704, the processing module 212 may generate a symbolic address for each of the base offsets "+20" and "+310." For example, the processing module 212 may generate the symbolic address "Function 1+20" for the base offset "+20" because the meta-function information 352 indicates that "Function 1" begins at base offset "0" with a size of "100." Accordingly, an offset of "+20" from the beginning of the relocatable image information 152 may also be expressed as the symbolic address "Function 1+20" because they identify the same location. Also for example, the processing module 212 may generate the symbolic address "Function 3+10" for the offset "+310" because the meta-function information 352 indicates that "Function 3" begins at offset "300" with a size of "50." Accordingly, an offset "+310" from the beginning of the relocatable image information 152 may also be expressed as the symbolic address "Function 3+10.".

At operation 706, the processing module 212 may generate new base offsets based on the symbolic address. For example, the processing module 212 may generate the offset "+270" for the symbolic address "Function 1+20" because the randomized meta-function information 372 in the randomized map information 207 indicates that "Function 1" now begins at offset "250." Accordingly, the offset "+270" and the symbolic address "Function 1+20" identify the same address in the randomized relocatable image information 154. Also for example, the processing module 212 may generate the base offset "+210" for the symbolic address "Function 3+10" because the randomized meta-function information 372 in the randomized map information 207 indicates that "Function 3" begins at base offset "200." Accordingly, the new base offset "+210" and the symbolic address "Function 3+10" identify the same location.

At operation 708, the processing module 212 may update the new offsets (e.g., +270, +210) in association with the symbol "HARRY" in the randomized export information 380 in the randomized map information 207.

At decision operation 710, the processing module 212 may identify whether more entries are present in the export information 360 of the map information 206. If the processing module 212 identifies that more entries are present, then a branch is made to operation 702. Otherwise the method ends.

FIG. 10B is a block diagram illustrating a method 730, according to an embodiment, to generate randomized import information 378. Recall that the loading module 218 may use the randomized import information 378 to link the randomized relocatable image information 154 with the other image (e.g., relocatable image information 152 or randomized relocatable image information 154). The method 730 may commence at operation 732 with the processing module 212 retrieving the next entry (e.g., row) of import information 358 from the map information 206. Assume the first row is for the symbol "BOB" and is Associated with the base offset 0 (as shown in FIG. 5B). Recall that the symbol "BOB" is a location that is defined at a location in the relocatable image information 152. Also recall the symbol "BOB" may be referenced by instruction information 228 (e.g., "Load Reg 1 with BOB" or "Jump to BOB") in another image (e.g., relocatable image information 152 or randomized relocatable image information 154).

At operation 734, the processing module 212 may generate a symbolic address for the base offset associated with the first entry. For example, the processing module 212 may generate the symbolic address "Function 1+0" for the base offset of "+0" because the meta-function information 352 indicates that "Function 1" begins at base offset "0" with a size of "100." Accordingly, the base offset of "+0" from the beginning of the relocatable image information 152 may also be expressed as the symbolic address "'Function 1'+0" because they identify the same location.

At operation 736, the processing module 212 may generate a new base offset based on the symbolic address. For example, the processing module 212 may generate the base offset "+250" for the symbolic address "'Function 1'+0" because the randomized meta-function information 372 in the randomized map information 207 indicates that "Function 1" now begins at base offset 250 (see FIG. 5D). Accordingly, the offset "+250" and the symbolic address "'Function 1'+0" identify the same address in the randomized relocatable image information 154.

At operation 738, the processing module 212 may update the randomized import information 378 with the new offset (e.g., +250) in association with the symbol "BOB." At decision operation 740, the processing module 212 may identify whether more entries are present in the export information 360 of the map information 206. If the processing module 212 identifies that more entries are present, then a branch is made to operation 732. Otherwise the method ends.

Figure 11:
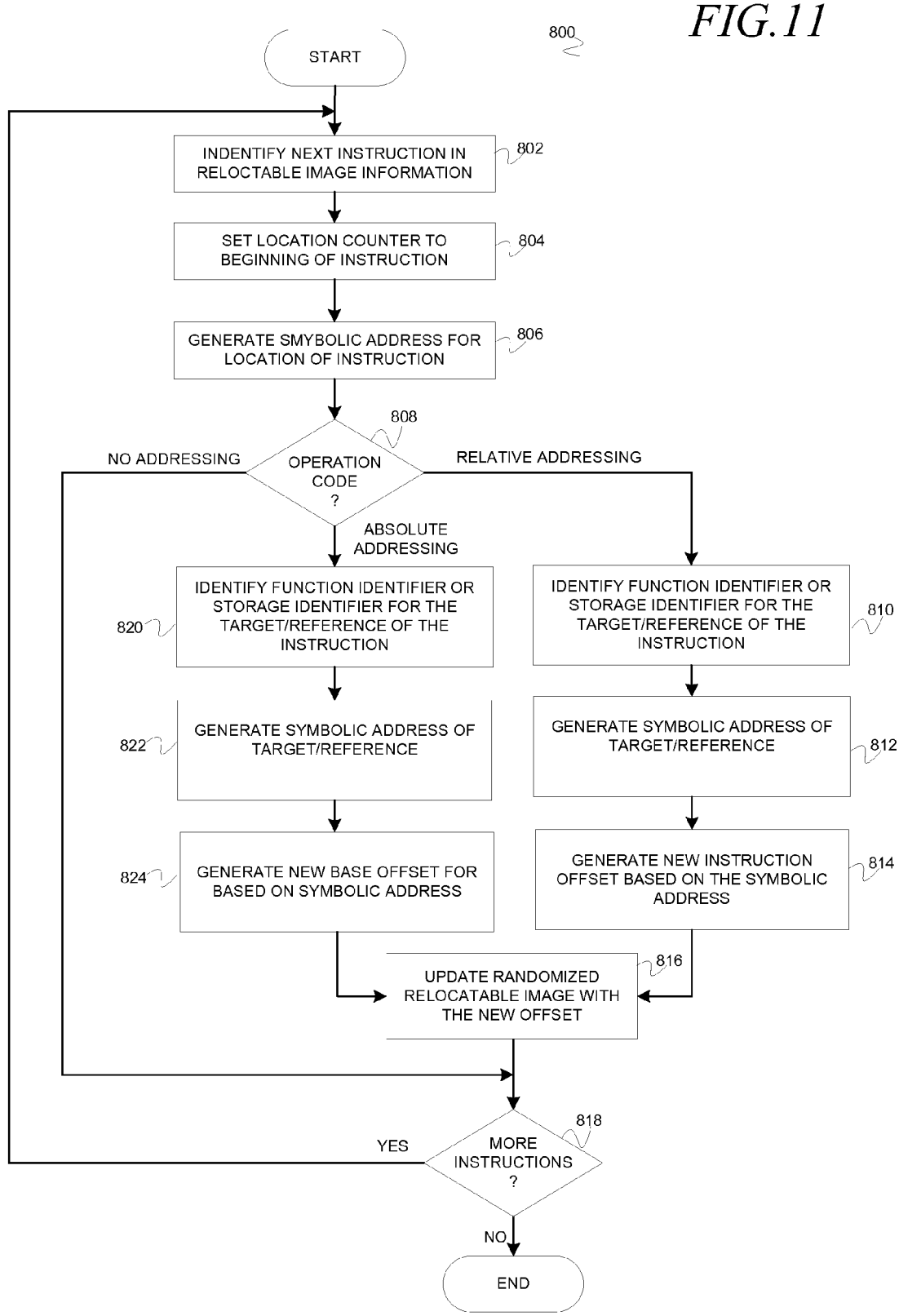
FIG. 11 is a block diagram illustrating a method, according to an embodiment, to update instruction information.

FIG. 11 is a block diagram illustrating a method 800, according to an embodiment, to update instruction information in randomized relocatable image information 154. The method may commence at operation 802 with the processing module 212 identifying the next instruction (e.g., instruction information 228) in the relocatable image information 152. At operation 804, the processing module 212 may set a location counter to the beginning of the current instruction. At operation 806, the processing module 212 may generate a symbolic address for the location of the instruction. For example, a location counter with a value of "+20" may be compared with the function start values in the meta-function information 352 to identify a function identifier signifying "function 1" (see FIG. 5A), thereby yielding a symbolic address of "'function 1' (+20)" for the location of the instruction.

At decision operation 808, the processing module 212 may identify whether the operation code 252 in the instruction information 228 indicates that the instruction information 228 includes absolute address information 254, relative address information 258, or no addressing information. If the processing module 212 identifies that the operation code 252 indicates absolute address information 254, then a branch is made to operation 820. If the processing module 212 identifies that the operation code 252 indicates relative address information 258, then a branch is made to operation 810. If the processing module 212 identifies that the operation code 252 indicates no addressing, then a branch is made to decision operation 818.

At operation 810, the processing module 212 may identify the target/reference function (e.g., function information 224) or storage block 226 identified by the relative address information 258 (e.g., instruction offset) in the instruction information 228 identified by the location counter. Recall that the instruction offset may be relative to the location of the instruction information 228 and positive or negative. In one embodiment, the processing module 212 may identify the target identifier (e.g., function identifier or storage identifier) by adding the value of the location counter to the instruction offset to generate a sum that is compared with the function start values and the storage start values in the map information 206. For example, a location counter of "+20" may be added to an instruction offset of "+300" to compute a sum of "+320" that identifies a location in the "function 3" (see FIG. 5A) in accordance with the function start values in the map information 206. In another example, a location counter of "+320" (e.g., "function 3") may be added to an instruction offset of "+300" to compute a sum of "+620" that identifies a location in the "storage block 5" (see FIG. 5A) in accordance with storage start values in the map information 206.

At operation 812, the processing module 212 may generate a symbolic address for the target/reference. For example, the processing module 212 may generate a symbolic address by subtracting the identified function start value or the identified storage start value from the immediately above computed sum and appending the result to the function identifier or storage identifier. Building on the above first example, the start value for "function 3" is +300, which may be subtracted from the sum of "+320" to yield the value "+20" to result in a symbolic address for the reference of the instruction as "'function 3'+(+20)" (see FIG. 5A). Building on the above second example, the start value for "storage block 5" is "+450", which may be subtracted from the sum of "+620" to yield the value "+170" to result in a symbolic address of "'storage block 5'+(+170)" (see FIG. 5A).

At operation 814, the processing module 212 may generate a new instruction offset based on the symbolic address. The processing module 212 may generate a new instruction offset for the instruction information 228 by applying the symbolic address to the appropriate start values in the randomized meta-storage information 374. Building on the above first example, the processing module 212 may apply the symbolic address of "'function 3' (+20)" to the start value of the "function 3" (e.g., 200) in the randomized meta-storage information 374 (e.g., see FIG. 5D) to yield a new instruction offset of "+220." Building on the above second example, the processing module 212 may apply the symbolic address of "'storage block 5'+(170)" to the start value of the "storage block 5" (e.g., 350) in the randomized meta-storage information (e.g., see FIG. 5D) to yield a new instruction offset of "+520."

At operation 816, the processing module 212 may update the randomized relocatable image information 154 with the new base or instruction offset. For example, the processing module 212 may update the relative address information 258 in the instruction information 228 with the new instruction offset, or the processing module 212 may update the absolute address information 254 in the instruction information 228 with the new base offset.

At operation 820, the processing module 212 may identify the target/reference function (e.g., function information 224) or storage block 226 identified by the absolute address information 254 (e.g., base offset) of the present instruction information 228 identified by the location counter. Recall that the base offset is relative to the base address of the randomized relocatable image information 154 and is positive. In one embodiment, the processing module 212 may identify a target/reference identifier (e.g., function identifier or storage identifier) by comparing the base offset with the function and storage start values in the map information 206 to identify the target. For example, a base offset of "+150" is a location in the "function 2" (see FIG. 5A) in accordance with the function start values in the map information 206. In another example, a base offset of "+755" is a location in the "storage block 6" (see FIG. 5A) in accordance with storage start values in the map information 206.

At operation 822, the processing module 212 may generate a symbolic address for the target/reference. For example, the processing module 212 may generate a symbolic address by subtracting the identified function start value or the identified storage start value from the base offset and appending the result to the function identifier or storage identifier. Building on the above first example, the start value for "function 2" is "+100," which may be subtracted from the base offset of "+150" to yield the value "+50" resulting in a symbolic address for the target of the instruction as "'function 2'+(+50)" (see FIG. 5A). Building on the above second example, the start value for "storage block 6" is "+750," which may be subtracted from the base offset "+755" to yield the value "+5" resulting in a symbolic address of "'storage block 6'+(+5)" (see FIG. 5A).

At operation 824, the processing module 212 may generate a new base offset based on the symbolic address. The processing module 212 may generate the new base offset by applying the symbolic address to the appropriate start values in the randomized meta-storage information 374. Building on the above first example, the processing module 212 may apply the symbolic address of "'function 2'+(+50)" to the start value of the "function 2" (e.g., 0) in the randomized meta-storage information 374 (e.g., see FIG. 5D) to yield a new base offset of "+50." Building on the above second example, the processing module 212 may apply the symbolic address of "'storage block 6'+(+170)" to the start value of the "storage block 6" (e.g., 600) in the randomized meta-storage information 374 (e.g., see FIG. 5D) to yield a new base offset of "+770."

At decision operation 818, the processing module 212 may identify whether there are more instruction information 228 (e.g., instructions) in the relocatable image information 152. If the processing module 212 identifies more instructions in the relocatable image information 152, then a branch is made to operation 802. Otherwise the method ends.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
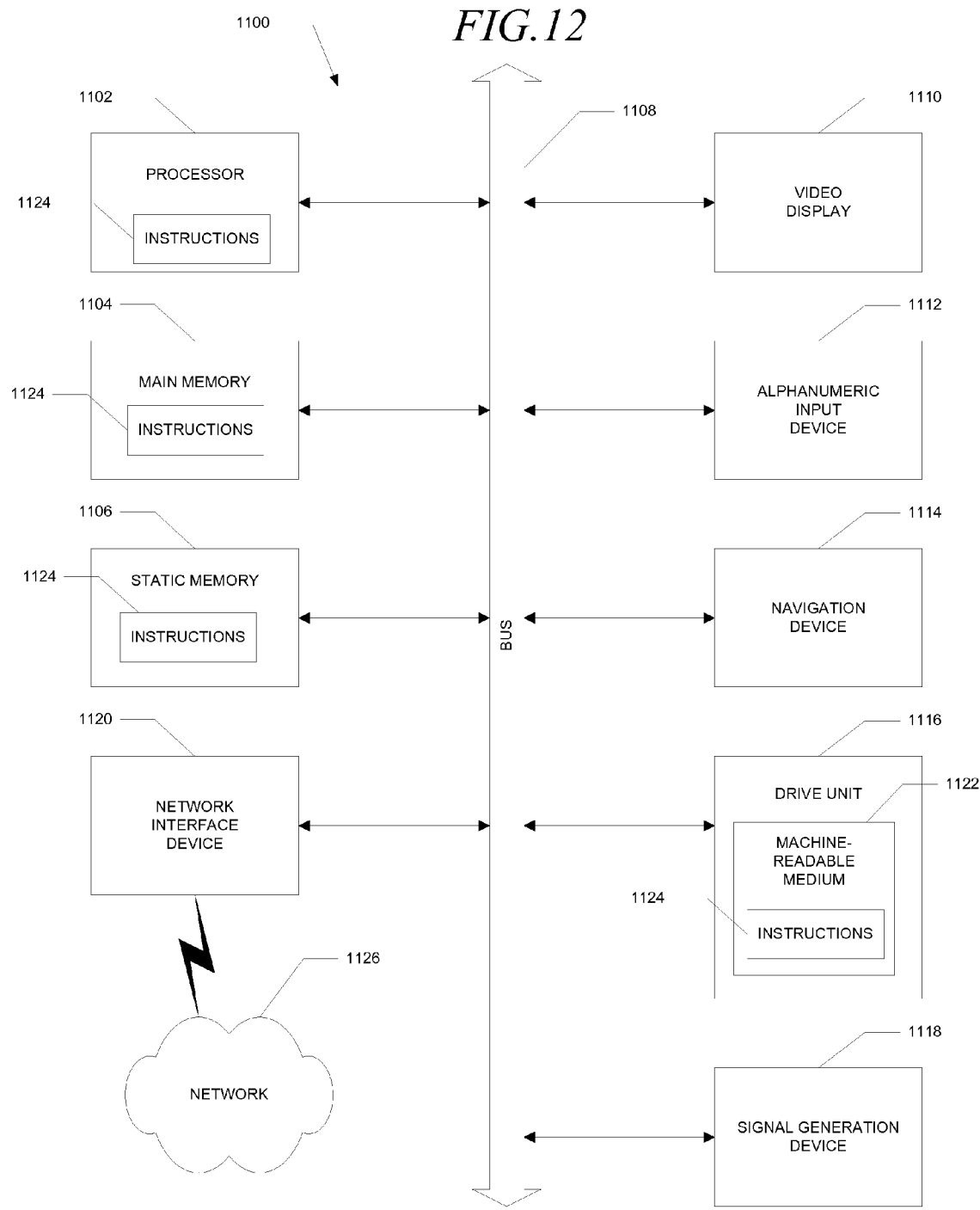
FIG. 12 shows a diagrammatic representation of a machine in the example form of a computer system, according to an example embodiment.

FIG. 12 is a block diagram of a machine within which instructions may be executed for causing the machine to perform any one or more of the methodologies discussed herein. In one example embodiment, the machine may include the computer 202. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a (PC, a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a CPU, a graphics processing unit (GPU), or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., a mouse), a disk drive unit 1116, a signal generation device 1118 (e.g., a speaker), and a network interface device 1120.

Machine-Readable Medium

The drive unit 1116 includes a machine-readable medium 1122 on which is stored one or more sets of instructions (e.g., instruction information 228) and data structures 1124 (e.g., storage blocks 226) (e.g., software) embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media. Instructions may also reside within the static memory 1106.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "disclosure" merely for convenience and without intending to voluntarily limit the scope of this application to any single disclosure or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, systems and methods for defeating malware with polymorphic software were disclosed. While the present disclosure has been described in terms of several example embodiments, those of ordinary skill in the art will recognize that the present disclosure is not limited to the embodiments described, but may be practiced with modification and alteration within the spirit and scope of the appended claims. The description herein is thus to be regarded as illustrative instead of limiting.

What is claimed is:

1. A system comprising:
   at least one processor, and memory including instruction information that, when executed by the at least one processor, cause the system to:

generate randomized relocatable image information, the generation of the randomized relocatable image information includes a randomization of a plurality of function information that is included in relocatable image information to generate the randomized relocatable image information, the plurality of function information includes a first function information, the first function information includes a first location that is used to enter the first function information, the generation of the randomized relocatable image information further includes an update of relative address information that is included in instruction information that is included in the randomized relocatable image information, the relative address information is utilized to enter the first function via the first location based on a new location of the first function in the randomized relocatable image information and the generation of the randomized relocatable image information being based on directive information to disable the randomizing of at least one part of the relocatable image information, the at least one part being identified by the directive information;

apply a base address to the randomized relocatable image information to generate randomized executable image information;

load the randomized executable image information into the memory; and execute the randomized executable image information.

2. The system of claim 1, wherein the at least one processor updates the relative address information that is utilized to access a first storage location in the randomized relocatable image information.

3. The system of claim 1, further comprising:
a linker to link module information to generate the relocatable image information and a part of map information.

4. The system of claim 3, wherein the map information is further generated by assembling assembly information to generate the module information and a part of the map information.

5. The system of claim 1, the at least one processor further configured to analyze the relocatable image information to generate map information.

6. The system of claim 5, wherein the at least one processor analyzes the relocatable image information to generate the map information.

7. The system of claim 6, wherein the disassembler stores the map information to persistent storage and retrieves the map information from persistent storage to optimize a subsequent analysis of the relocatable image information.

8. The system of claim 3, wherein the map information includes directive information to disable the randomizing of at least one part of the relocatable image information, the at least one part is identified by the directive information.

9. The system of claim 5, wherein the at least one processor analyzes the relocatable image information in a ".NET Framework" to generate the map information.

10. A method including:
generating randomized relocatable image information, the generating including:
randomizing a plurality of function information that is included in relocatable image information to generate the randomized relocatable image information, the plurality of function information including a first function information, the first function information including a first location that is used to enter the first function information, the generation of the randomized relocatable image information being based on directive information to disable the randomizing of at least one part of the relocatable image information, the at least one part being identified by the directive information;

updating instruction information in the randomized relocatable image information, the updating the instruction information including updating relative address information utilized to enter the first function via the first location based on a new location of the first function in the randomized relocatable image information;

applying a base address to the randomized relocatable image information to generate randomized executable image information;

loading the randomized executable image information into the memory; and executing the randomized executable image information.

11. The method of claim 10, wherein the updating instruction information in the randomized relocatable image information includes updating the relative address information that is utilized to access a first storage location in the randomized relocatable image information.

12. The method of claim 10, wherein the relocatable image information is generated by linking module information; and wherein the linking module information generates a part of map information that is associated with the relocatable image information.

13. The method of claim 12, wherein the map information is further generated by assembling assembly information to generate the module information and a part of the map information.

14. The method of claim 10, further comprising analyzing the relocatable image information to generate map information.

15. The method of claim 14, wherein the analyzing includes utilizing a disassembler to analyze the relocatable image information to generate the map information.

16. The method of claim 15, wherein the analyzing further includes:
storing the map information to persistent storage; and
retrieving the map information from persistent storage to optimize a subsequent analysis of the relocatable image information.

17. The method of claim 12, wherein the map information includes directive information to disable randomization of at least one part of the relocatable image information, the at least one part is identified by the directive information.

18. The method of claim 14, wherein the analyzing the relocatable image information to generate the map information includes analyzing the relocatable image information in a ".NET Framework."

19. A non-transitory machine-readable medium storing instructions that, when executed by at least one processor, cause the at least one processor to perform the following actions:
generating randomized relocatable image information, the generating including:
randomizing a plurality of function information that is included in relocatable image information to generate the randomized relocatable image information, the plurality of function information including a first function information, the first function information including a first location that is used to enter the first function information, the generation of the randomized relocatable image information being based on directive information to disable the randomizing of at least one part of the relocatable image information, the at least one part being identified by the directive information;

updating instruction information in the randomized relocatable image information, the updating the instruction information including updating relative address information utilized to enter the first function via the first location based on a new location of the first function in the randomized relocatable image information;

applying a base address to the randomized relocatable image information to generate randomized executable image information;

loading the randomized executable image information into the memory; and executing the randomized executable image information.

20. The non-transitory machine-readable medium of claim 19, wherein the updating instruction information in the randomized relocatable image information includes updating the relative address information that is utilized to access a first storage location in the randomized relocatable image information.

* * * * *